United States Patent
Suzuki et al.

(10) Patent No.: US 8,556,587 B2
(45) Date of Patent: Oct. 15, 2013

(54) PROPELLER FAN

(75) Inventors: Atsushi Suzuki, Aichi (JP); Takayuki Kobayashi, Aichi (JP); Kazuyuki Kamiya, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 660 days.

(21) Appl. No.: 12/747,043

(22) PCT Filed: Apr. 17, 2009

(86) PCT No.: PCT/JP2009/057751
§ 371 (c)(1),
(2), (4) Date: Jun. 9, 2010

(87) PCT Pub. No.: WO2009/128529
PCT Pub. Date: Oct. 22, 2009

(65) Prior Publication Data
US 2010/0260608 A1    Oct. 14, 2010

(30) Foreign Application Priority Data
Apr. 18, 2008    (JP) .................... 2008-109272

(51) Int. Cl.
*B64C 11/18*    (2006.01)
(52) U.S. Cl.
USPC ....................................... 416/193 R
(58) Field of Classification Search
USPC ..................... 416/193 R, 189, 228, 236 R
See application file for complete search history.

(56) References Cited

U.S. PATENT DOCUMENTS

| 2004/0091359 A1* | 5/2004 | Vanmoor ................. 416/228 |
| 2007/0031250 A1* | 2/2007 | Suzuki et al. ............ 415/220 |
| 2008/0056899 A1* | 3/2008 | Jiang et al. ............ 416/186 R |
| 2011/0014052 A1* | 1/2011 | Hoskins .................. 416/212 R |

FOREIGN PATENT DOCUMENTS

| JP | 58-113899 | * | 8/1983 |
| JP | 58-113899 U |  | 8/1983 |
| JP | 62-204000 U |  | 12/1987 |
| JP | 63-048996 | * | 4/1988 |
| JP | 63-048996 U |  | 4/1988 |
| JP | 2-136597 A |  | 5/1990 |
| JP | 8-159090 A |  | 6/1996 |
| JP | 2003-035296 A |  | 2/2003 |
| JP | 2005-106003 A |  | 4/2005 |
| JP | 2007-040202 A |  | 2/2007 |
| WO | 2008/072516 | * | 6/2008 |
| WO | 2008/072516 A1 |  | 6/2008 |

OTHER PUBLICATIONS

International Search Report of PCT/JP2009/057751, Mailing Date of Jun. 9, 2009.

* cited by examiner

*Primary Examiner* — Edward Look
*Assistant Examiner* — William Grigos
(74) *Attorney, Agent, or Firm* — Westerman, Hattori, Daniels & Adrian, LLP (57) ABSTRACT

Provided is a propeller fan that can prevent deformation of the propeller fan while maintaining the basic performance thereof, such as the air blowing performance, efficiency, and noise performance. In a plastic propeller fan including a hub and a plurality of blades integrally molded in a radial pattern on the outer circumference of the hub, assuming that the radial size of each blade from the base to the outer peripheral edge is 100, a ring member that joins the plurality of blades together is provided at a dimension position of 5 to 45 from the outer peripheral edge.

4 Claims, 7 Drawing Sheets

PROPELLER FAN

TECHNICAL FIELD

The present invention relates to a plastic propeller fan having a plurality of blades that are integrally molded in a radial pattern on the outer circumference of a cylindrical hub.

BACKGROUND ART

Plastic propeller fans applied to cooling fans for automobile radiators and air-conditioning condensers are installed in narrow engine compartments and are required to be lightweight and are thus under the constraint that the size in the airflow direction (depth dimension) cannot be increased. Therefore, the depth dimensions of blades, a hub, a shroud, etc. that constitute a propeller fan are made as thin as possible. In addition, the gap sizes between them and the radiator, the condenser, or the like should be as small as possible.

Such minimization of the gap sizes causes the cooling fans installed in severe operating environments influenced by vibrations, high temperature, water pressure due to water splashed during driving on a flooded road or the like to interfere with the radiator or the condenser due to deformation of the blades. In particular, thin plastic propeller fans rotated at high speed are easily deformed due to their shape, which could cause a serious accident due to interference with the core of the radiator or the condenser. Known solutions for preventing deformation of plastic propeller fans include, in addition to increasing the strength of the blades by increasing the wall thickness thereof, configurations in which the outermost peripheries of the blades are joined together with a ring member, as shown in Patent Literatures 1 and 2.

{Citation List}

{Patent Literature}

{PTL 1} Japanese Unexamined Patent Application, Publication No. Hei 8-159090

{PTL 2} Japanese Unexamined Patent Application, Publication No. 2005-106003

SUMMARY OF INVENTION

Technical Problem

However, increasing the wall thickness of the blades increases the weight of the propeller fan, which therefore poses the problems of not only going against the requirement for low weight but also decreasing productivity. In addition, as shown in Patent Literatures 1 and 2, the configuration in which the outermost peripheries of the blades are joined together with a ring member limits the shape of the outermost peripheries of the blades at which air-blowing efficiency is the highest in the propeller fan. This therefore has the problem of decreasing the overall basic performance of the propeller fan, such as the air blowing performance, efficiency, and noise performance.

The present invention is made in consideration of such circumstances, and an object thereof is to provide a propeller fan that can prevent deformation while maintaining the basic performance, such as the air blowing performance, efficiency, and noise performance.

Solution to Problem

To solve the problems described above, a propeller fan of the present invention adopts the following solutions.

Specifically, a propeller fan according to the present invention is a plastic propeller fan including a hub and a plurality of blades integrally molded in a radial pattern on the outer circumference of the hub, the propeller fan including a ring member that joins the plurality of blades together, wherein, assuming that the radial size of each blade from the base to the outer peripheral edge is 100, the ring member is provided at a dimension position of 5 to 45 from the outer peripheral edge.

According to the present invention, since the plurality of blades are joined together with the ring member, the strength of the blades can be increased without increasing the wall thickness of the blades. In addition, assuming that the radial size of the blades is 100, the ring member is provided at a dimension position of 5 to 45 from the outer peripheral edge, excluding the outermost peripheries of the blades; therefore, the reinforcing ring member can be provided without limiting the shape of the outermost peripheries of the blades that provide the highest efficiency for the air blowing function of the propeller fan. This can ensure flexibility in designing the shape of the outermost peripheries of the blades and can also maintain the basic performance of the propeller fan, such as the air blowing performance, efficiency, and noise performance, and the effect of preventing deformation by increasing the strength of the blades.

The propeller fan of the present invention may be configured such that the ring member is in the form of a cylinder having a fixed width in the axial direction.

With this configuration, since the ring member is in the form of a cylinder having a fixed width in the axial direction, the reinforcing effect against deformation of the blades in the axial direction can be enhanced. In addition, the cylindrical shape of the ring member can provide an airflow rectifying effect and can reduce a centripetal flow generated at the outer circumference of the fan to thereby prevent a decrease in the effective radius of the fan. This can therefore improve the basic performance, such as the air blowing performance, efficiency, and noise performance.

The propeller fan of the present invention may be configured such that the cylindrical ring member is provided with forming-die parting lines between the adjacent blades; a draft angle toward an air outflow end is provided at a positive pressure surface side, with the blades therebetween, and a draft angle toward an air inflow end is provided at a negative pressure surface side; level differences that are formed on the ring member due to the draft angles are eliminated at the air inflow end by adjusting the wall thickness of the ring member and the draft angle provided at the inner circumferential surface side; and level differences corresponding to the amount of adjustment are concentrated at the inner circumferential surface side of the ring member and at the air outflow end.

With this configuration, level differences that are formed on the ring member due to the draft angles when the cylindrical ring member is integrally molded by injection molding are eliminated at the air inflow end by adjusting the wall thickness of the ring member and the draft angle provided at the inner circumferential surface side thereof, and level differences corresponding to the amount of adjustment are concentrated at the inner circumferential surface side of the ring member at the air outflow end. This can therefore eliminate the level differences, which act as resistance against the airflow, from the ring member. Accordingly, the ring member does not exert an adverse influence on the fan performance etc., and the propeller fan with the cylindrical ring member can easily be manufactured by injection molding, as in the related art.

The propeller fan of the present invention may be configured such that the draft angle at the inner circumferential surface side of the cylindrical ring member is set larger than the draft angle at the outer circumferential surface side of the cylindrical ring member.

With this configuration, the draft angle at the inner circumferential surface side of the cylindrical ring member is set larger than the draft angle at the outer circumferential surface side of the cylindrical ring member. Therefore, even if thermal shrinkage occurs during injection molding, the molding die can easily be removed because the draft angle at the inner circumferential surface side located in the direction of thermal shrinkage is set to be large. Accordingly, the provision of the cylindrical ring member does not hinder manufacturing of the propeller fan, so that the propeller fan can be manufactured as in the related art.

The propeller fan of the present invention may be configured such that, in one of the propeller fans described above, the ring member is provided at positions passing through the crests of serrations provided at the trailing edges of the blades.

With this configuration, since the ring member is provided at positions passing through the crests of serrations provided at the trailing edges of the blades, the length of the ring member in a cord longitudinal direction on the blades can be maximized. This can therefore maximize the reinforcing effect of the ring member and can avoid stress concentration at the troughs due to provision of the ring member at the troughs of the serrations.

The propeller fan of the present invention may be configured such that, in one of the propeller fans described above, in addition to the ring member provided at the dimension position, a ring member is provided concentrically at least one location on the inner circumference side thereof.

With this configuration, in addition to the ring member provided at the dimension position of 5 to 45 from the outer peripheral edge, a ring member is provided concentrically at at least one location on the inner circumference side thereof. This can therefore further enhance effects such as the reinforcing effect against deformation of the blades in the axial direction, the airflow rectifying effect, and the preventive effect on reduction in the effective radius of the fan.

Advantageous Effects of Invention

According to the present invention, the strength of the blades can be increased without increasing the wall thickness of the blades, and the reinforcing ring member can be provided without limiting the shape of the outermost peripheries of the blades that provide the highest efficiency for the air blowing function of the propeller fan. This can ensure flexibility in designing the shape of the outermost peripheries of the blades and can also maintain the basic performance of the propeller fan, such as the air blowing performance, efficiency, and noise performance, and the effect of preventing deformation by increasing the strength of the blades.

DESCRIPTION OF EMBODIMENTS

Embodiments of the present invention will be described using the drawings.

{First Embodiment}

A first embodiment of the present invention will be described below with reference to FIGS. 1 to 6B.

Figure 1:
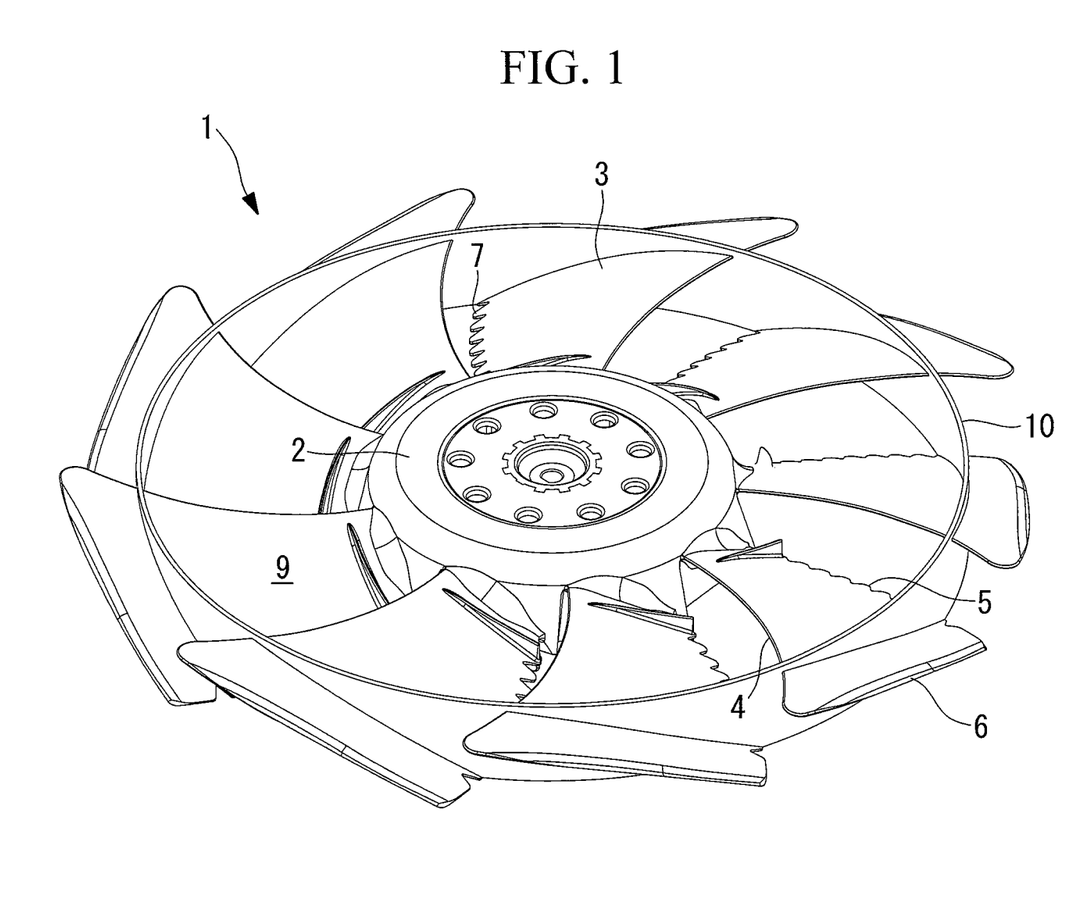
FIG. 1 is a perspective view of a propeller fan according to a first embodiment of the present invention.
Figure 2:
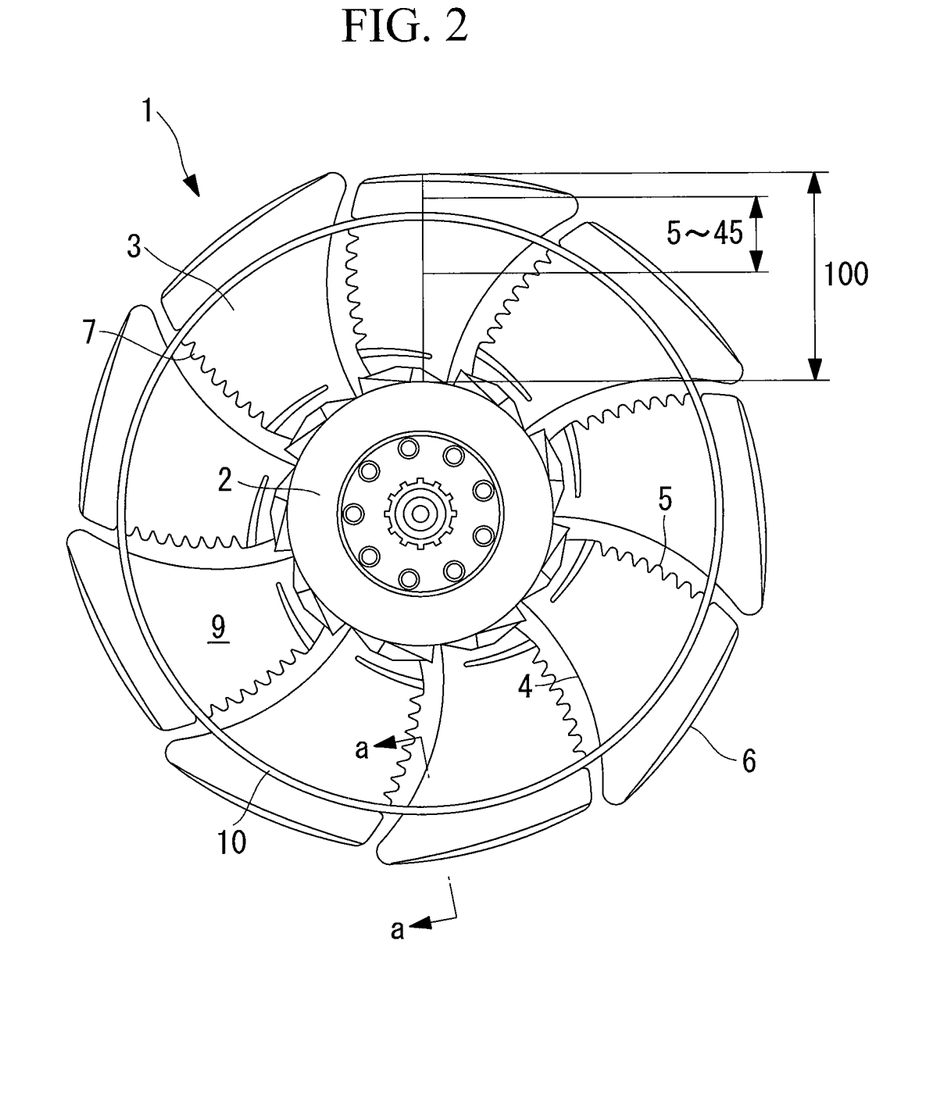
FIG. 2 is a front view of the propeller fan shown in FIG. 1.
Figure 3:
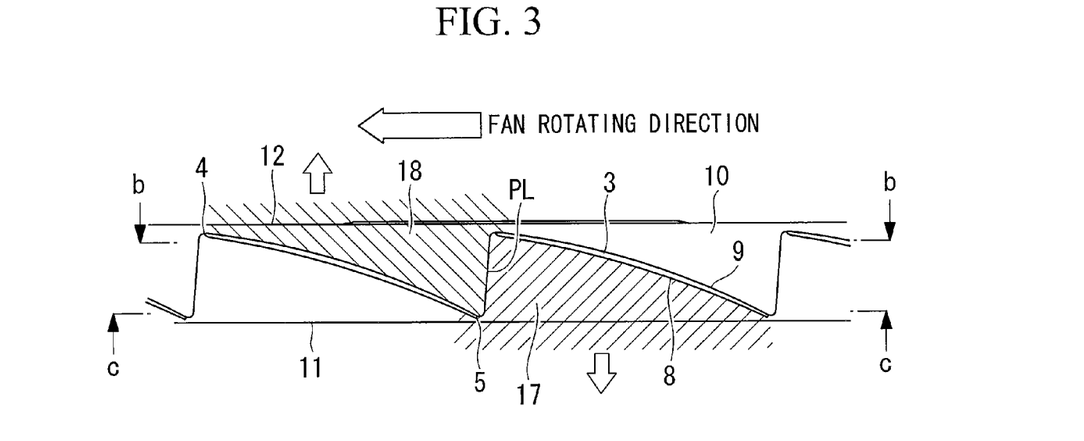
FIG. 3 is a partial side view of the propeller fan shown in FIG. 2, as viewed from the outer circumference thereof.

FIG. 1 shows a perspective view of a propeller fan 1 according to the first embodiment of the present invention; FIG. 2 shows a front view thereof; and FIG. 3 shows a partial side view as seen from the outer circumference.

The propeller fan 1 is an injection-molded component made of, for example, polypropylene plastic (PP) containing about 30 wt % of glass fibers and is configured such that a cylindrical hub 2 is provided at the center portion and a plurality of (nine in the illustrated example) blades (vanes) 3 are integrally formed in a radial pattern on the outer circumference of the hub 2.

Each blade 3 has a leading edge 4 located upstream in the rotating direction in the circumferential direction, a trailing edge 5 located downstream in the rotating direction, and an outer peripheral edge 6 that joins the leading edge 4 and the trailing edge 5 together at the outermost peripheral position in the radial direction and has an airfoil shape in cross-section and a sickle shape in which the leading edge 4 is curved in the rotating direction, that is, toward the trailing edge 5 of the adjacent blade 3, so as to assume a convex shape, and the trailing edge 5 is slightly curved so as to assume a convex shape in a direction away from the leading edge 4 of the adjacent blade 3. The trailing edge 5 is provided with a serration 7.

In addition, the blades 3 are integrally formed on the outer circumference of the cylindrical hub 2 with a predetermined inclination and are configured to have a fixed blade height (about 30 mm in this embodiment) in the axial direction between the leading edge 4 and the trailing edge 5. When the blades 3 are rotated clockwise (right-handed rotation) in FIGS. 1 and 2, the rear side of the plane of each drawing is assumed to be a positive pressure surface (pressure surface) 8, and the front side of the plane of each drawing is assumed to be a negative pressure surface 9, and air is circulated from the front side of the plane of the drawing toward the rear side.

To prevent deformation of the blades 3, the above-descried propeller fan 1 is provided with a reinforcing ring member 10 that joins the plurality of blades 3 together. The reinforcing ring member 10 is constituted of a cylindrical thin-plate ring having a fixed width (substantially equal to or a little larger than the height of the blades) in the axial direction and is integrally molded with the blades 3. In addition, assuming that the radial size of each blade 3 from the base to the outer peripheral edge 6 is 100, the reinforcing ring member 10 is provided at a dimension position of 5 to 45 from the outer peripheral edge 6, as shown in FIG. 2.

The position at which the ring member 10 is provided is determined in order to exclude the outermost peripheries of the blades 3 so as not to limit the shape of the outermost peripheries of the blades that provide the highest efficiency for the propeller fan 1 and to ensure a sufficient reinforcing effect against deformation of the blades 3, and is set, assuming that the radial size of the blades 3 is 100, at a dimension position of 5 to 45 from the outer peripheral edge 6, as described above.

Figure 4:
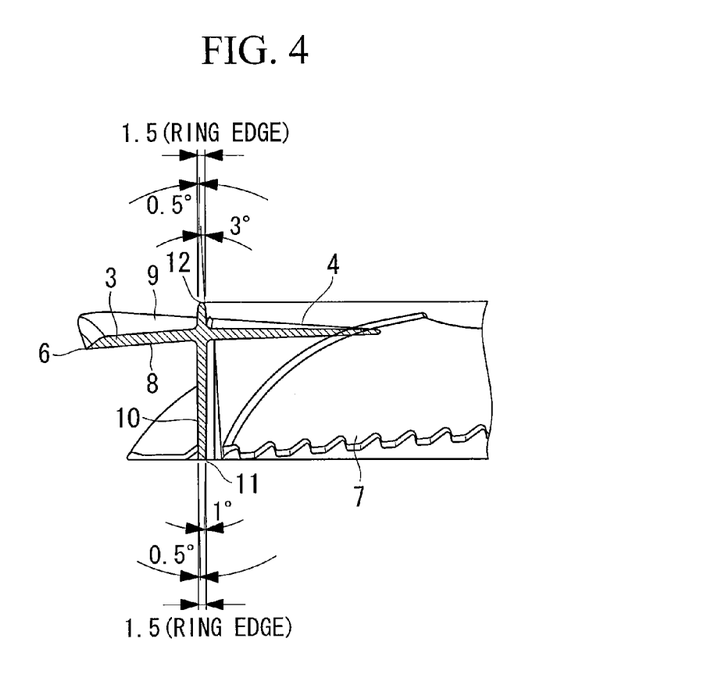
FIG. 4 is a cross-sectional view taken along a-a in FIG. 2.

The propeller fan 1 provided with the ring member 10 is integrally molded by injection molding. In this case, as shown in FIG. 3, a molding die therefor is provided with parting lines PL between the adjacent blades 3 and is divided into a metal mold 17 that molds the positive pressure surface 8 side and a metal mold 18 that molds the negative pressure surface 9 side, with the blades 3 therebetween. As shown in FIG. 4, the cylindrical ring member 10 is provided with a draft angle toward an air outflow end 11 of the cylindrical ring member 10 at the positive pressure surface 8 side and a draft angle toward an air inflow end 12 of the cylindrical ring member 10 at the negative pressure surface 9 side, with the blades 3 therebetween, for releasing the molds (in the direction of the arrows in FIG. 3).

Figure 6A:
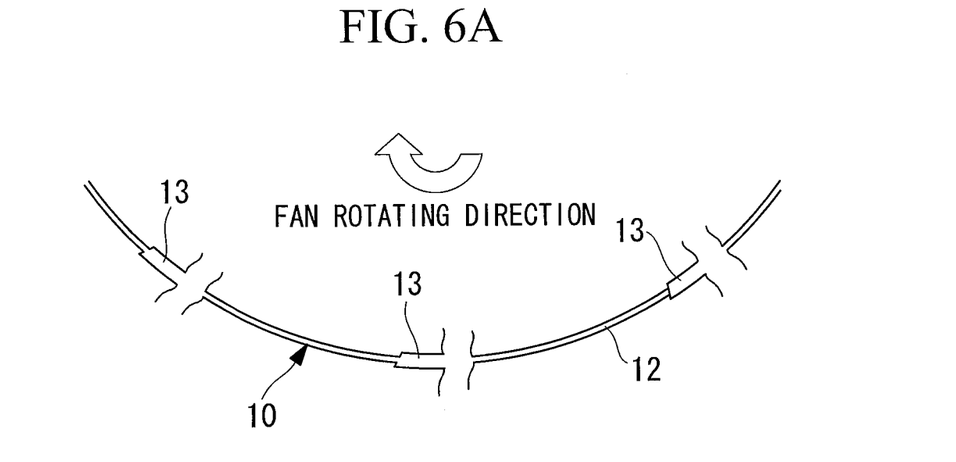
FIG. 6A is a cross-sectional view taken along b-b of a comparative example corresponding to FIG. 5A.
Figure 6B:
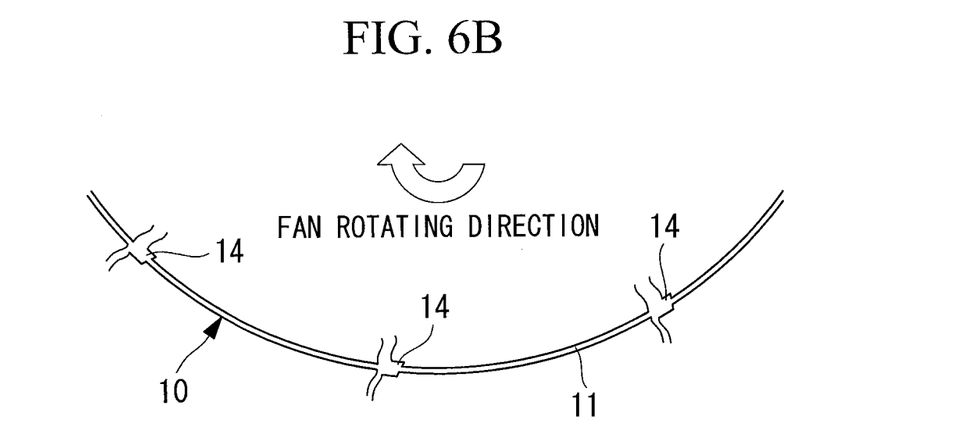
FIG. 6B is a cross-sectional view taken along c-c of a comparative example corresponding to FIG. 5B.

Providing the draft angles as described above generally causes the ring member 10 to have level differences 13 and 14 due to the draft angles at the air inflow end 12 side along a b-b cross-section and at the air outflow end 11 side along a c-c cross-section in FIG. 3, as shown in FIG. 6A and FIG. 6B, respectively. Of the level differences 13 and 14, the level difference 13 at the air inflow end 12 formed along the b-b cross-section opposes the air flow as viewed from the rotating direction of the propeller fan 1 (the direction of the arrows in FIGS. 3, 6A, and 6B), which makes the air flow turbulent, thus causing a decrease in efficiency and an increase in noise.

Figure 5A:
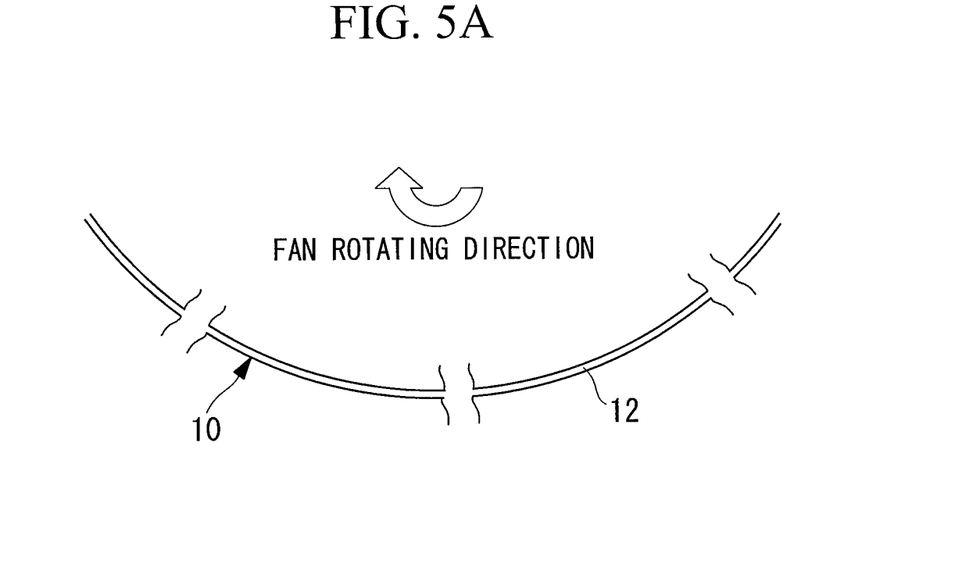
FIG. 5A is a cross-sectional view taken along b-b in FIG. 3.
Figure 5B:
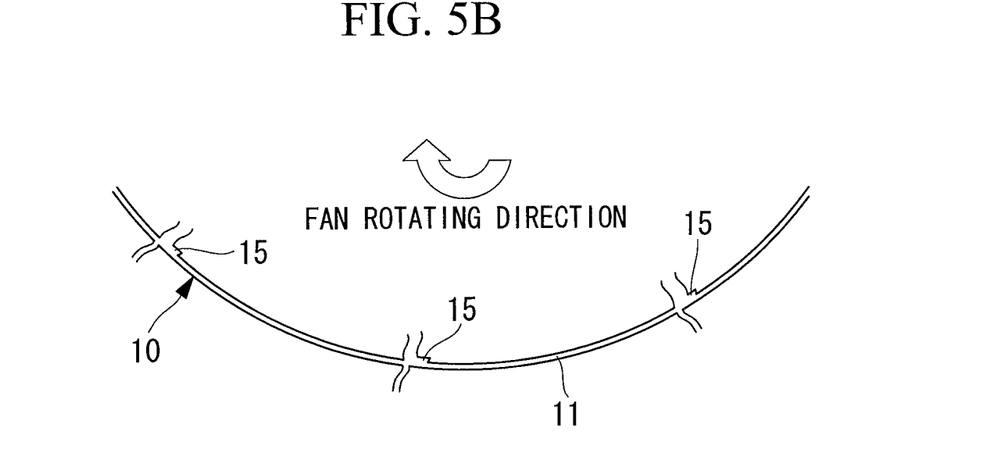
FIG. 5B is a cross-sectional view taken along c-c in FIG. 3.

Thus, in this embodiment, as shown in FIGS. 5A and 5B, the wall thickness of the cylindrical ring member 10 is adjusted to a thickness that does not form the level differences 13 on the outer circumferential surface side and the inner circumferential surface side of the ring member 10 at the air inflow end 12 side along the b-b cross-section of FIG. 3 within a permissible range, and the outer circumferential surface is provided with draft angles of, for example, about 0.5° toward the air outflow end 11 and the air inflow end 12 at the positive pressure surface 8 side and the negative pressure surface 9 side, with the blades 3 therebetween, respectively, as shown in FIG. 4.

In addition, in correspondence with the above-described wall-thickness adjustment for eliminating the level difference 13 at the air inflow end 12 side of the ring member 10, draft angles provided at the inner circumferential surface side of the ring member 10, with the blades 3 therebetween, are varied between the positive pressure surface 8 side and the negative pressure surface 9 side; for example, the draft angle provided at the positive pressure surface 8 side is set to about 1°, and the draft angle provided at the negative pressure surface 9 side is set to about 3°. Level differences 15 at the air outflow end 11 side caused by the difference in draft angle are concentrated at the inner circumferential surface side of the ring member 10, so that no level differences that act as resistance against the airflow remain on the ring member 10.

Furthermore, the draft angle (1° or 3°) provided at the inner circumferential surface side of the ring member 10 is set larger than the draft angle (0.5°) provided at the outer circumferential surface side (1° or 3°>0.5°) so that the molding die can easily be removed even if thermal shrinkage occurs during molding. In addition, the ring member 10 is provided at positions passing through the crests of the serrations 7 provided at the trailing edges 5 of the blades 3.

With the configuration described above, this embodiment provides the following operational advantages.

The plastic propeller fan 1 applied to automobile radiators and air-conditioning condensers is provided in an engine compartment and is influenced by vibrations, high temperature, water pressure due to water splashed during driving on a flooded road or the like. These act on the propeller fan 1 as external forces that tend to deform the blades 3. As a countermeasure, the cylindrical ring member 10 that joins the plurality of blades 3 together is provided to increase the strength of the blades 3, in particular, to provide a strength against deformation in the axial direction, thus preventing deformation of the propeller fan 1 due to the external forces described above.

In addition, assuming that the radial size of the blades 3 is 100, because the ring member 10 is provided at a dimension position of 5 to 45 from the outer peripheral edge 6, excluding the outermost peripheries of the blades 3, the reinforcing ring member 10 can be provided without limiting the shape of the outermost peripheries of the blades that provide the highest efficiency for the air blowing function of the propeller fan 1. This can ensure flexibility in designing the shape of the outermost peripheries of the blades and allows the basic performance of the propeller fan, such as the air blowing performance, efficiency, and noise performance, to be maintained.

Accordingly, this embodiment can achieve both the effect of preventing deformation of the propeller fan 1 by increasing the strength of the blades 3 while firmly maintaining a low weight by keeping the wall thickness of the blades 3 small without increasing the wall thickness, as well as ensuring the basic performance of the propeller fan 1, such as the air blowing performance, efficiency, and noise performance.

In addition, since the ring member 10 is constituted of a cylindrical ring having a fixed width in the axial direction, an air flow rectifying effect can be provided, and in particular, a centripetal flow that is generated at the outer circumference of the fan, which is noticeable in a propeller fan that has a small depth dimension, can be reduced, so that a decrease in the effective radius of the fan can be prevented. Thus, the basic performance, such as the air blowing performance, efficiency, and noise performance, can be improved.

Furthermore, since a level difference or the like that acts as resistance against the air flow is not created on the ring member 10 by designing the wall thickness and the draft angles of the cylindrical ring member 10, the ring member 10 does not exert an adverse influence on the fan performance etc. even with the configuration in which the cylindrical ring member 10 is integrally molded on the blades 3, and the propeller fan 1 with the cylindrical ring member can easily be manufactured by injection molding, as in the related art. In addition, the draft angles of the cylindrical ring member 10 are set such that the draft angle of the inner circumferential surface side is set larger than the draft angle of the outer circumferential surface side. Therefore, even if thermal shrinkage occurs during injection molding, the molding die can easily be removed because the draft angle of the inner circumferential surface side, which is influenced more by the thermal shrinkage, is larger. Accordingly, the propeller fan 1 with the cylindrical ring member can be manufactured without problems.

In addition, since the ring member 10 is provided at positions passing through the crests of the serrations 7 provided at the trailing edges 5 of the blades 3, the length of the ring member 10 in a cord longitudinal direction on the blades 3 can be maximized. This can maximize the effect of reinforcing the blades 3 using the ring member 10 and can avoid stress concentration on the troughs due to provision of the ring member 10 at the troughs of the serrations 7, thereby further enhancing reliability in increasing the strength.

{Second Embodiment}

Figure 7:
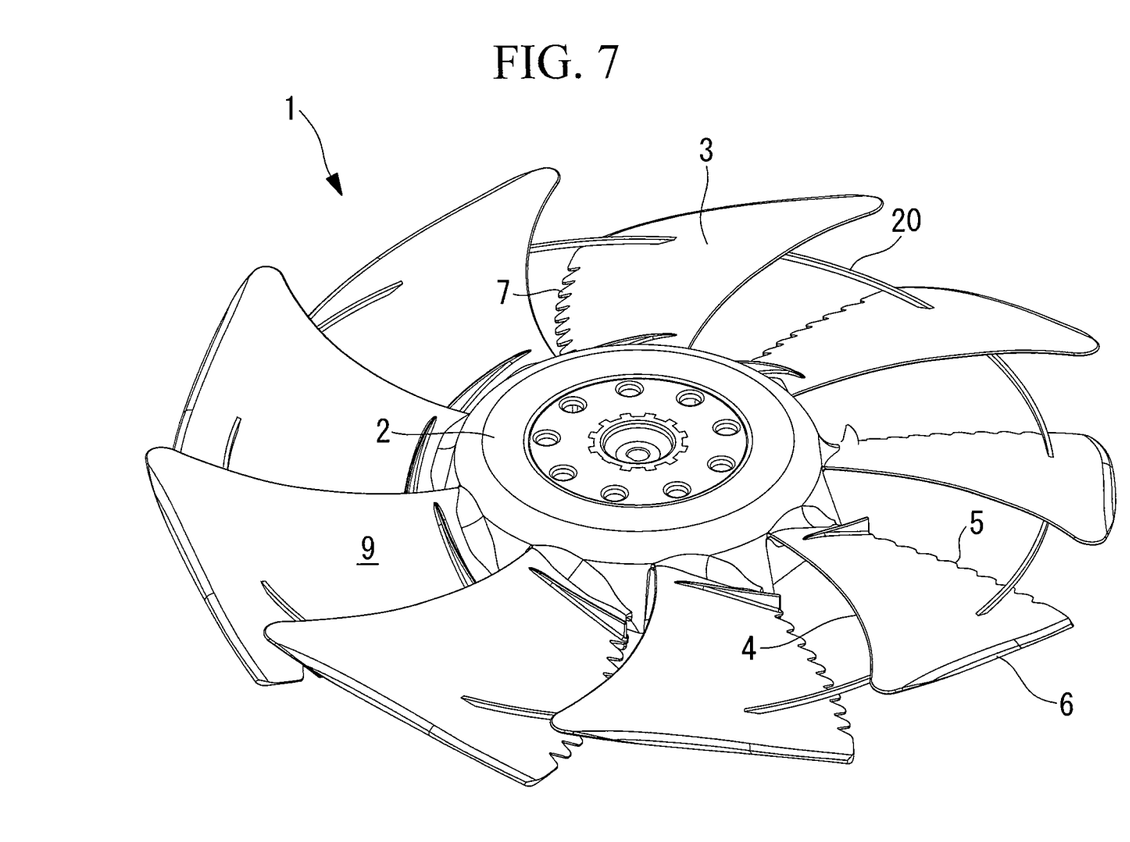
FIG. 7 is a perspective view of a propeller fan according to a second embodiment of the present invention.

Next, a second embodiment of the present invention will be described using FIG. 7.

This embodiment differs from the above-described first embodiment in the configuration of the ring member 20. Since the other features are the same as those of the first embodiment, descriptions thereof will be omitted.

This embodiment is configured such that the plurality of blades 3 are joined together with a rod-like ring member 20 that is circular, polygonal, or the like in cross-section, instead of the cylindrical ring member 10.

This configuration in which the plurality of blades 3 are joined together with the rod-like ring member 20 in this way can also increase the strength of the blades 3, thus obtaining the effect of preventing deformation of the propeller fan 1. In addition, assuming that the radial size of each blade 3 is 100, the ring member 20 is provided at a dimension position of 5 to 45 from the outer peripheral edge 6, excluding the outermost peripheries of the blades 3; therefore, the ring member 20 can be provided without limiting the shape of the outermost peripheries of the blades that provide the highest efficiency for the air blowing function of the propeller fan 1. This can ensure the basic performance of the propeller fan 1 and can also prevent deformation thereof.

{Third Embodiment}

Figure 8:
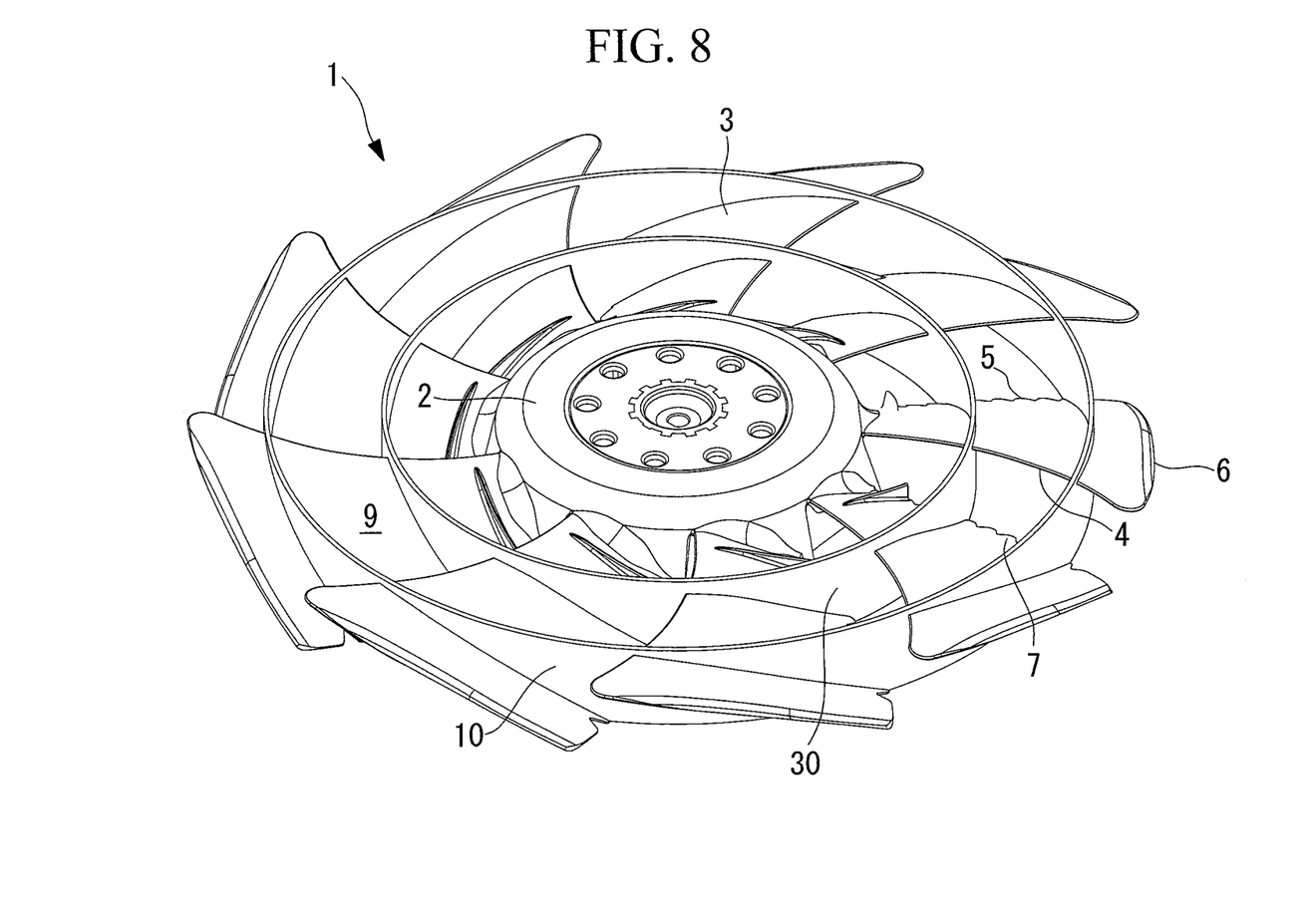
FIG. 8 is a perspective view of a propeller fan according to a third embodiment of the present invention.

Next, a third embodiment of the present invention will be described using FIG. 8.

This embodiment differs from the above-described first embodiment in that an additional ring member 30 is provided in addition to the ring member 10. Since the other features are the same as those of the first embodiment, descriptions thereof will be omitted.

This embodiment is configured such that another cylindrical ring member 30 is provided concentrically on the inner circumference side of the cylindrical ring member 10.

Providing the cylindrical ring members 10 and 30 concentrically in multiple positions at two or more locations including a dimension position of 5 to 45 from the outer peripheral edge 6, excluding the outermost peripheries of the blades 3, as described above, can further enhance effects such as the reinforcing effect against deformation of the blades 3 in the axial direction, the airflow rectifying effect, and the preventive effect on reduction in the effective radius of the fan.

The present invention is not limited to the invention according to the embodiments described above, and modifications can be made as appropriate without departing from the spirit thereof. For example, in the above embodiments, the draft angles provided on the cylindrical ring member 10 have been described using specific numerical values; however, it is needless to say that those are merely examples, and the present invention is not limited thereto. In addition, also the shape and configuration of the blades 3 are not limited to those of the above embodiments, and various modifications may be made; for example, the blades need not have the serrations 7.

REFERENCE SIGNS LIST

1 propeller fan
2 hub
3 blade
5 trailing edge
6 outer peripheral edge
7 serration
8 positive pressure surface
9 negative pressure surface
10, 20, 30 ring member
11 air outflow end
12 air inflow end
15 level difference
17, 18 molding die
PL parting line

The invention claimed is:

1. A plastic propeller fan including a hub and a plurality of blades integrally molded in a radial pattern on the outer circumference of the hub, the propeller fan comprising:
   a ring member that joins the plurality of blades together, wherein:
   assuming that the radial size of each blade from the base to the outer peripheral edge is 100, the ring member is provided at a dimension position of 5 to 45 from the outer peripheral edge;
   the ring member is in the form of a cylinder having a fixed width in the axial direction; and
   the cylindrical ring member is integrally molded with the blades by injection molding; a molding die provided with parting lines between the adjacent blades; a draft angle toward an air outflow end is provided at a positive pressure surface side, with the blades therebetween, and a draft angle toward an air inflow end is provided at a negative pressure surface side; wherein the ring member having a pre-adjusted wall thickness and the draft angle provided at the inner circumferential surface side to eliminate level differences formed on the ring member due to the draft angles at the air inflow end; and the level differences, corresponding to the amount of the pre-adjusted wall thickness are concentrated at the inner circumferential surface side of the ring member at the air outflow end.

2. The propeller fan according to claim 1, wherein the draft angle at the inner circumferential surface side of the cylindrical ring member is set larger than the draft angle at the outer circumferential surface side of the cylindrical ring member.

3. The propeller fan according to claim 1, wherein the ring member is provided at positions passing through crests of serrations provided at the trailing edges of the blades.

4. The propeller fan according to claim 1, wherein, in addition to the ring member provided at the dimension position, a ring member is provided concentrically at at least one location on the inner circumference side thereof.

* * * * *